(12) United States Patent
Inoue et al.

(10) Patent No.: US 7,104,151 B2
(45) Date of Patent: Sep. 12, 2006

(54) TWO-WHEEL DRIVE AND FOUR-WHEEL DRIVE CHANGE-OVER APPARATUS AND DRIVING ACTUATOR THEREFOR

(75) Inventors: Masaru Inoue, Yokohama (JP); Kenji Taguchi, Yokohama (JP)

(73) Assignee: Jidosha Denki Kogyo Co., Ltd., Yokohama (JP)

( * ) Notice: Subject to any disclaimer, the term of this patent is extended or adjusted under 35 U.S.C. 154(b) by 531 days.

(21) Appl. No.: 10/667,595

(22) Filed: Sep. 23, 2003

(65) Prior Publication Data

US 2005/0061100 A1 Mar. 24, 2005

(51) Int. Cl.
*F16H 1/16* (2006.01)
(52) U.S. Cl. .......................... 74/425; 180/337
(58) Field of Classification Search ................ 74/425, 74/473.36; 180/337; 192/138
See application file for complete search history.

(56) References Cited

U.S. PATENT DOCUMENTS

| | | | |
|---|---|---|---|
| 4,449,416 A * | 5/1984 | Huitema ............... 74/336 R |
| 4,664,217 A | 5/1987 | Welch et al. | |
| 4,805,472 A | 2/1989 | Aoki et al. | |
| 6,003,395 A * | 12/1999 | Rogg et al. ............... 74/335 |
| 6,315,073 B1 * | 11/2001 | Nonaka ..................... 180/247 |
| 6,688,448 B1 * | 2/2004 | Giefer et al. ........... 192/219.4 |
| RE39,054 E * | 4/2006 | Kagata et al. ............ 475/198 |

FOREIGN PATENT DOCUMENTS

| | | |
|---|---|---|
| EP | 0 187 117 B1 | 12/1985 |
| JP | 07-179138 | 7/1995 |

* cited by examiner

*Primary Examiner*—David Fenstermacher
(74) *Attorney, Agent, or Firm*—McGinn IP Law Group, PLLC (57) ABSTRACT

An actuator is provided with an output shaft connected to a driving gear, a pair of cam followers turned by the shaft and driving the cams held on driven shafts urging members held in housings of the driving gear, a rotation retaining plate mounted on the output shaft so that the rotation retaining plate cannot be rotated relatively to the output shaft, a plurality of pressing parts formed on the rotation retaining plate so as to project therefrom, and slits for preventing the driving gear and pressing parts from interfering with each other. The rotation of the driving gear is transmitted to the output shaft via the springs and rotation retaining plate. When the rotation of the driving gear is continued with the output shaft locked and stopped, one of both end portions of each spring is pressed by the corresponding pressing member.

6 Claims, 12 Drawing Sheets

TWO-WHEEL DRIVE AND FOUR-WHEEL DRIVE CHANGE-OVER APPARATUS AND DRIVING ACTUATOR THEREFOR

BACKGROUND OF THE INVENTION

1. Field of the Invention

This invention relates to a two-wheel drive and four-wheel drive change-over apparatus suitably used for a part-time four-wheel drive vehicle (4WD) and the like, and an actuator for driving the same.

2. Related Art

A part-time four-wheel drive vehicle (4WD) capable of driving four wheels only in case of necessity in a two-wheel drive vehicle is known. A change-over apparatus for switching two-wheel driving condition and four-wheel driving condition from one to the other in such a part-time four-wheel drive vehicle is also known which is adapted to selectively drive a two-wheel drive and four-wheel drive change-over shaft and a four-wheel speed change-over shaft so that four driving condition including two-wheel driving, four-wheel high-speed driving, four-wheel neutral and four-wheel low-speed driving condition can be switched from one to another.

A related art actuator has some inconveniences. Namely, when two-wheel driving condition is switched to four-wheel driving condition, the phases of an output gear for rear wheels and a front drive gear are shifted from each other, and the spline engaging of the two gears with each other cannot be done by a two-wheel and four-wheel drive change-over slider in some cases. When four-wheel driving condition is switched to two-wheel driving condition, the power needed to stop the spline engaged condition of the two gears becomes too large, and the two gears cannot be disengaged from each other in some cases. It is also known that this actuator is provided as countermeasures with a waiting mechanism for waiting for a certain period of time until the time at which the two gears are meshed with each other or disengaged from each other. The related art examples of such techniques include the techniques disclosed in, for example, JP-A-7-179138. A waiting mechanism disclosed in this publication includes a spiral spring, first and second plates and a bush member. Therefore, the number of the parts is large, and a work efficiency in the assembling of the parts is low. Moreover, since the dimensions of the waiting mechanism increase, the actuator as a whole became large-sized.

Under the circumstances, the present invention has been made so as to solve these problems, and aims at providing a miniaturized, inexpensive actuator by reducing the number of parts constituting a waiting mechanism and thereby improving the work efficiency in the assembling of the parts.

A first invention provides an actuator which has two driven shafts arranged in parallel with each other and made movable in the axial direction thereof, and cams held on these driven shafts for driving the driven shafts respectively, and which is adapted to move the driven shafts selectively in the axial direction thereof by a predetermined stroke by driving each cam to a predetermined stopping position in accordance with a mode changed over from another by a switching operation of an operating switch having a plurality of modes to be switched, the actuator including a motor adapted to be rotated forward or backward by a current supplied thereto, a driving gear meshed with a worm formed on a shaft of the motor, an output shaft connected to the driving gear, a pair of cam followers adapted to be turned by a rotation of the output shaft, and engaged with the cams and drive the same, urging members held in urging member housings formed at predetermined intervals along a circle which is the same as an outer circumference of the driving gear, a rotation retaining plate mounted on the output shaft so that the rotation retaining plate cannot be rotated relatively thereto, a plurality of pressing parts each of which is formed so as to project from the rotation retaining plate, and each of which is capable of pressing either one of both end portions of each urging member, slits formed in the portions of the driving gear which are among the urging member housings so as to prevent the driving gear and pressing parts from interfering with each other, a first actuator case in which the driving gear, rotation retaining plate and output shaft are housed, and a second actuator case fixed to the first actuator case, supporting each driven shaft so that the driven shafts can be moved freely in the axial direction thereof and housing each of the cams therein, a rotation of the driving gear being transmitted to the output shaft via each urging member and rotation retaining plate, either one of both end portions of each urging member being pressed by a corresponding pressing part of the rotation retaining plate when the rotation of the driving gear is continued after the output shaft is locked and stopped in the intermediate position of the rotation thereof.

A second invention provides an actuator which is in accordance with that of the first invention, in which the plural urging member housings formed on the driving gear is three arcuate urging member housings arranged at regular intervals in the circumferential direction thereof, the urging members being three cylindrical compression springs.

A third invention provides an actuator for actuating a two-wheel drive and four-wheel drive change-over apparatus having a first change-over shaft for switching two-wheel drive/four-wheel drive and a second change-over shaft for changing speeds of four wheels, the first and second change-over shaft being arranged in parallel with each other in a transfer and movable in axial directions thereof by cams held on the first and second change-over shafts for driving the first and second change-over shafts respectively, wherein the actuator is adapted to switch selectively from one to another of four driving conditions including two-wheel drive, four-wheel high-speed drive, four-wheel neutral and four-wheel low-speed driving condition by driving the cams in the change-over apparatus to predetermined stopping positions respectively in accordance with a mode changed by a shifting operation of a mode change-over switch, and thereby moving the change-over shafts selectively in the axial directions at predetermined strokes, the actuator including: a motor adapted to be rotated forward or backward by a current supplied thereto, a driving gear meshed with a worm formed on a shaft of the motor, an output shaft connected to the driving gear, a pair of cam followers adapted to be turned by a rotation of the output shaft, and engaged with the cams and drive the same, urging members held in urging member housings formed at predetermined intervals along a circle which is the same as the outer circumference of the driving gear and in the circumferential direction thereof, a rotation retaining plate mounted on the output shaft so that the rotation retaining plate cannot be rotated relatively thereto, a plurality of pressing parts each of which is formed so as to project from the rotation retaining plate, and each of which is capable of pressing either one of both end portions of each urging member, slits formed in the portions of the driving gear which are among the urging member housings so as to prevent the driving gear and pressing parts from interfering with each other, a first actuator case in which the driving gear, rotation retaining plate and output shaft are housed, and a second actuator case fixed to the first actuator case, supporting each driven shafts so that the driven shafts can be moved freely in the axial direction and housing each of the cams therein, a rotation of the driving gear being transmitted to the output shaft via each urging member and rotation retaining plate, either one of both end portions of each urging member being pressed by a corresponding pressing part of the rotation retaining plate when the rotation of the driving gear is continued after the output shaft is locked and stopped in the intermediate position of the rotation thereof.

A fourth invention provides an actuator for driving a two-wheel drive and four-wheel drive change-over apparatus, which actuator is in accordance with that of the third invention, in which the plural urging member housings formed on the driving gear are three arcuate urging member housings formed on the driving gear at regular intervals in the circumferential direction thereof, the urging members being three cylindrical compression springs.

A fifth invention provides two-wheel drive and four-wheel drive change-over apparatus having a first change-over shaft for switching two-wheel drive/four-wheel drive and a second change-over shaft for changing speeds of four wheels, the first and second change-over shafts being arranged in parallel with each other in a transfer and movable in axial directions thereof, cams held on the first and second change-over shafts for driving the first and the second change-over shafts respectively, and an actuator adapted to be driven rotationally to predetermined stopping positions respectively in accordance with a mode changed by a switching operation of a mode change-over switch, and drive each cam and thereby move the change-over shafts selectively in the axial directions thereof at predetermined strokes, wherein the actuator includes: a motor adapted to be rotated forward or backward by a current supplied thereto, a driving gear meshed with a worm formed on a shaft of the motor, an output shaft connected to the driving gear, a pair of cam followers adapted to be turned by a rotation of the output shaft, and engaged with each of the cams and drive the same, urging members held in urging member housings formed at predetermined intervals along a circle which is the same as an outer circumference of the driving gear, a rotation retaining plate supported on the output shaft so that the rotation retaining plate cannot be rotated relatively thereto, a plurality of pressing parts each of which is formed so as to project from the rotation retaining plate, and each of which is capable of pressing either one of both end portions of a corresponding urging member, slits formed in the portions of the driving gear which are among the urging member housings so as to prevent the driving gear and pressing parts from interfering with each other, a first actuator case in which the driving gear, rotation retaining plate and output shaft are housed, and a second actuator case fixed to the first actuator case, supporting the change-over shafts so that the change-over shafts can be moved freely in the axial direction, and housing the cams therein, a rotation of the driving gear being transmitted to the output shaft via each urging member and rotation retaining plate, either one of both end portions of each urging member being pressed by a corresponding pressing part of the rotation retaining plate when the rotation of the driving gear is continued after the output shaft is locked and stopped in the intermediate position of the rotation thereof.

A sixth invention provides a two-wheel drive and four-wheel drive change-over apparatus which is in accordance with that of the fifth invention, in which the plural urging member housings formed on the driving gear are three arcuate urging member housings formed on the driving gear at regular intervals in the circumferential direction thereof, the urging members being three cylindrical compression springs.

DETAILED DESCRIPTION OF THE PREFERRED EMBODIMENTS

A mode of embodiment of the present invention will now be described on the basis of what are shown in the drawings.

Figure 1:
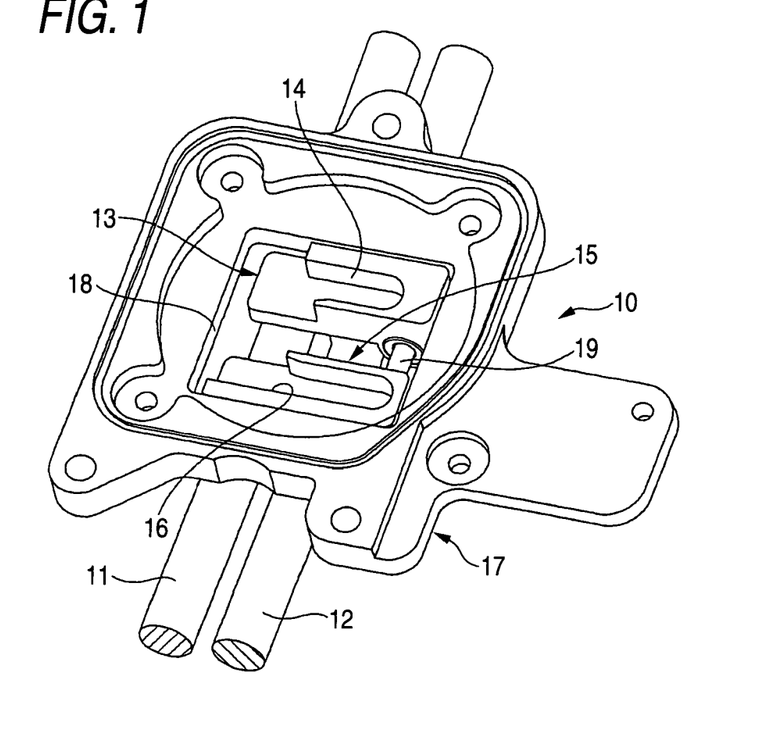
FIG. 1 is a perspective view showing a principal portion of the actuator used for a mode of embodiment of the two-wheel drive and four-wheel drive change-over apparatus according to the present invention.
Figure 2:
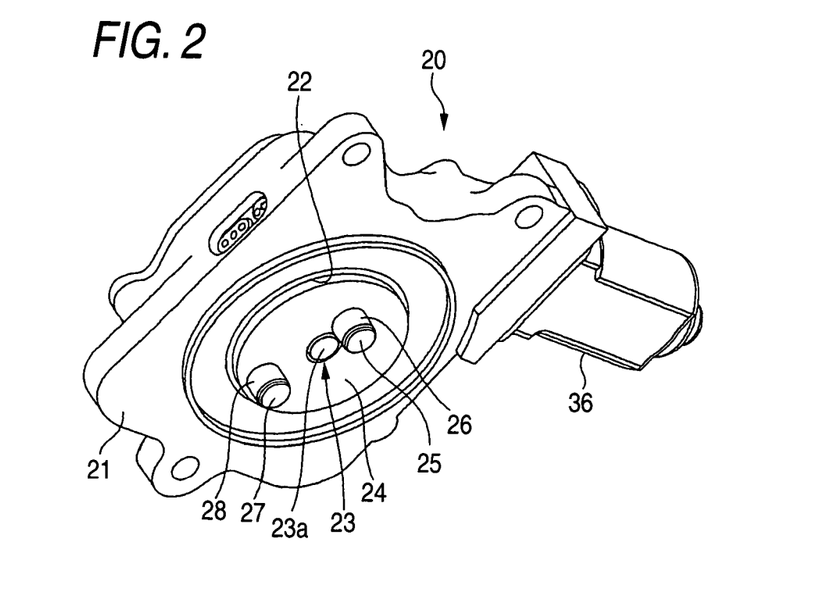
FIG. 2 is a perspective view of the same actuator taken from the lower side thereof.
Figure 3:
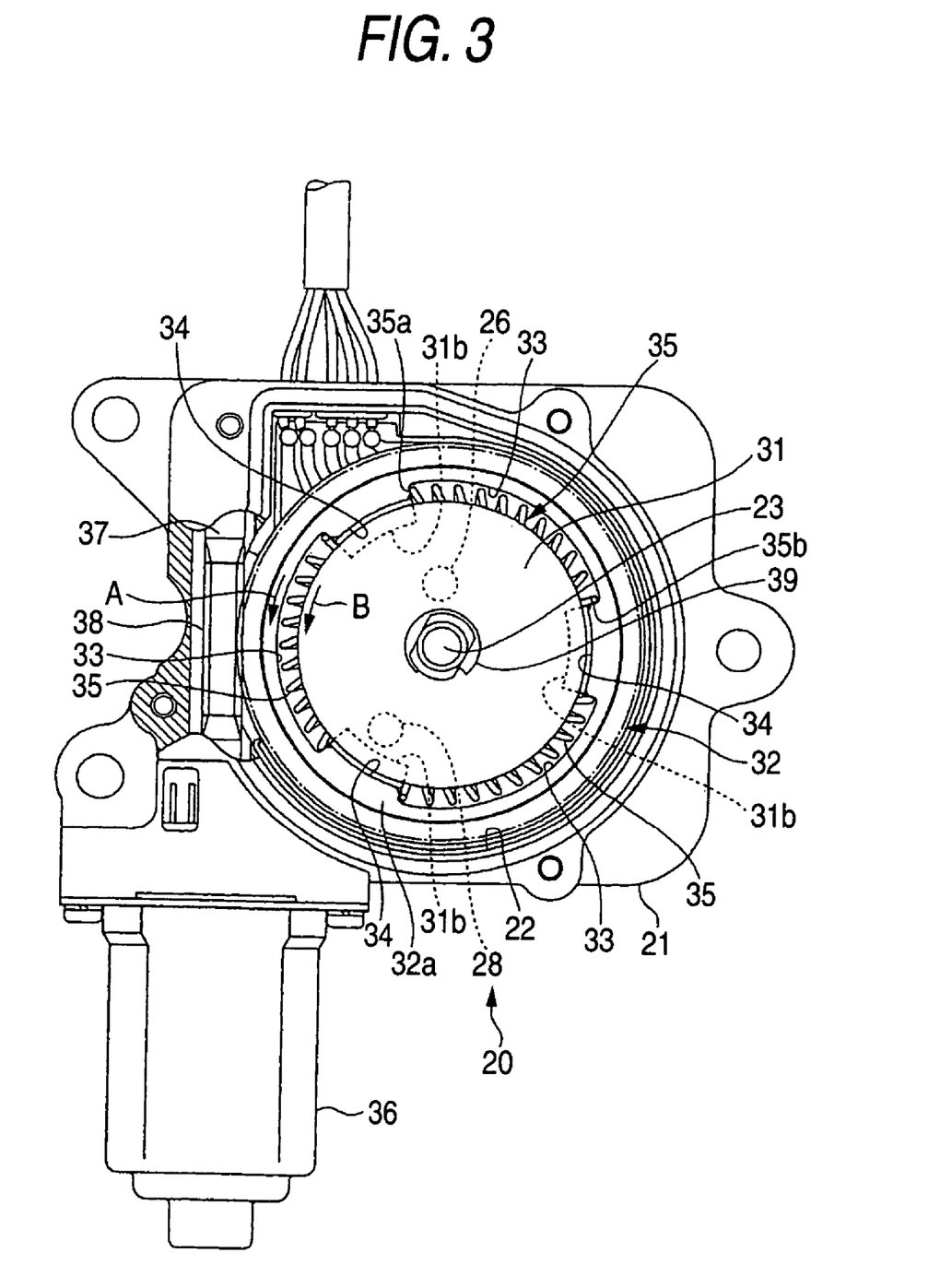
FIG. 3 is a partially sectioned plan view showing the same actuator.
Figure 4:
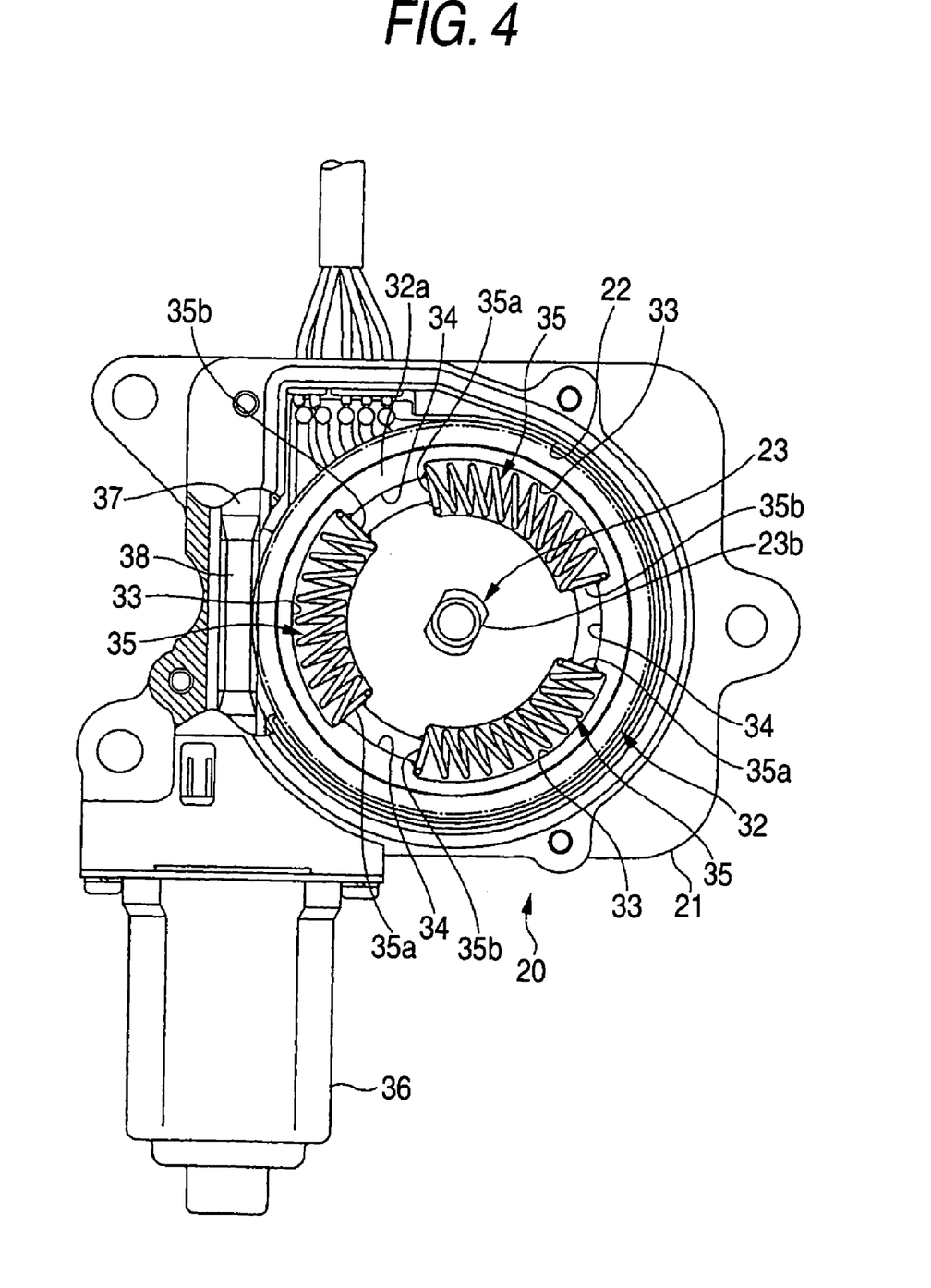
FIG. 4 is a plan view of the same actuator with the rotation retaining plate thereof removed.
Figure 5:
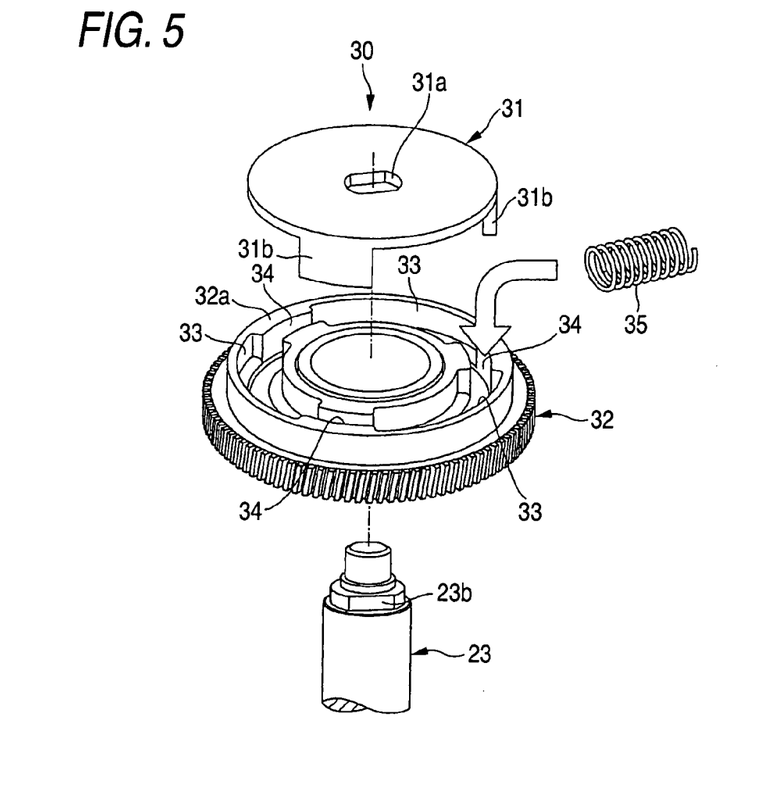
FIG. 5 is an exploded view in perspective showing the relation between the rotation retaining plate, driving gear and output shaft of the same actuator.
Figure 6:
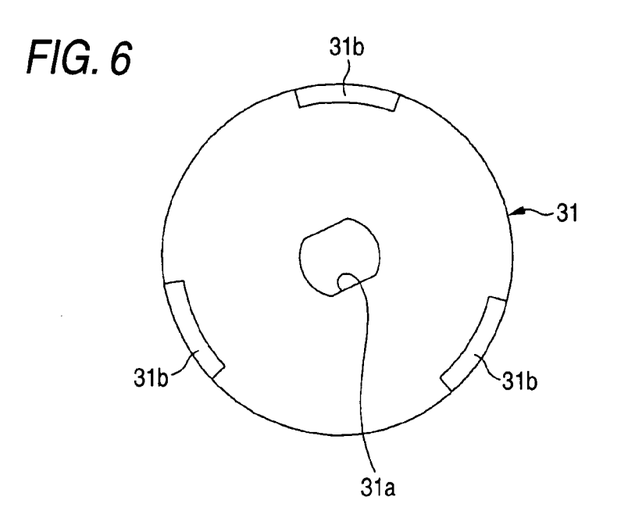
FIG. 6 is a bottom view of this rotation retaining plate.
Figure 7:
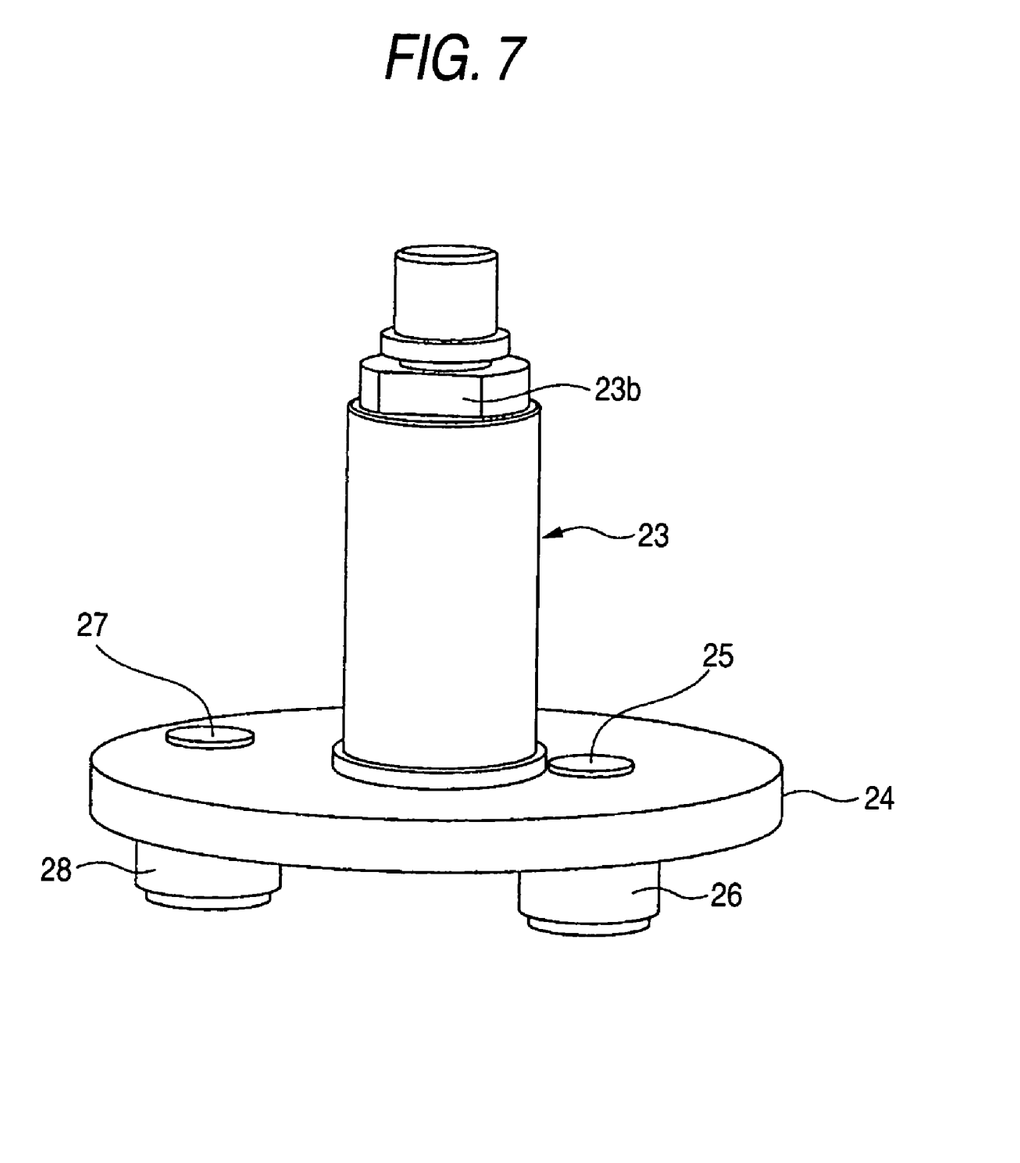
FIG. 7 is a perspective view of this output shaft.
Figure 8:
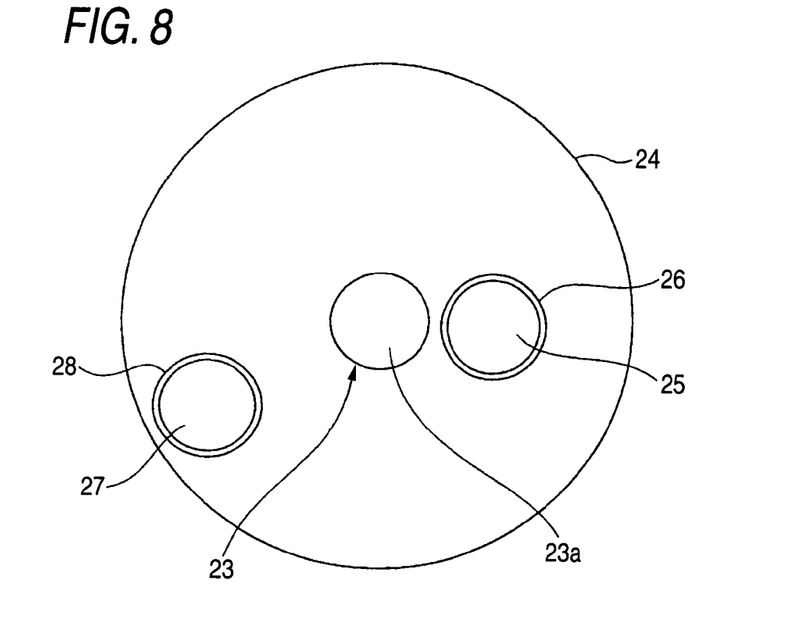
FIG. 8 is a bottom view of the same output shaft.
Figure 9:
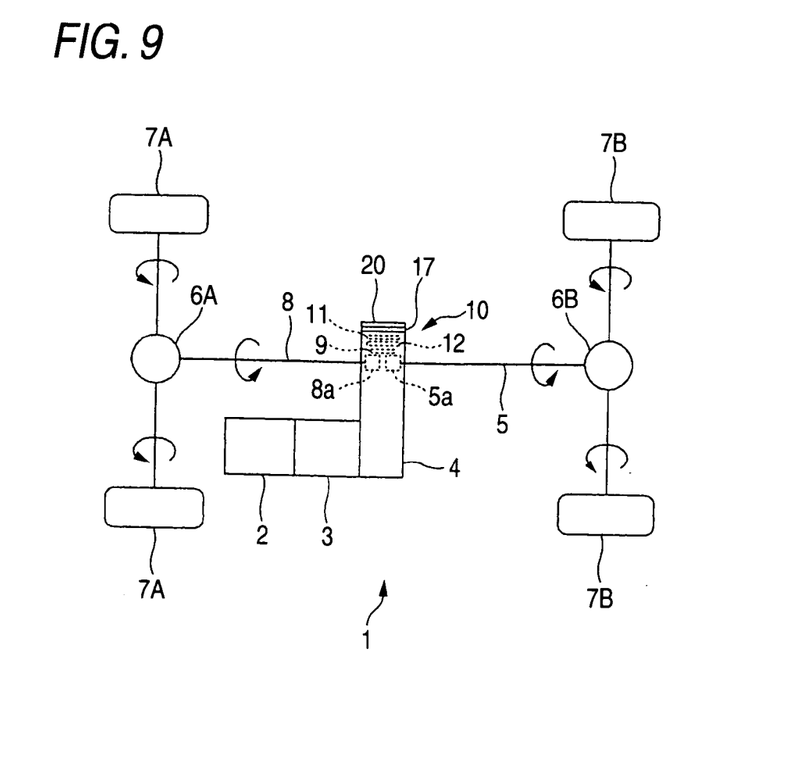
FIG. 9 is a schematic construction diagram of a part-time four-wheel drive vehicle using the above two-wheel drive and four-wheel drive change-over apparatus.
Figure 10:
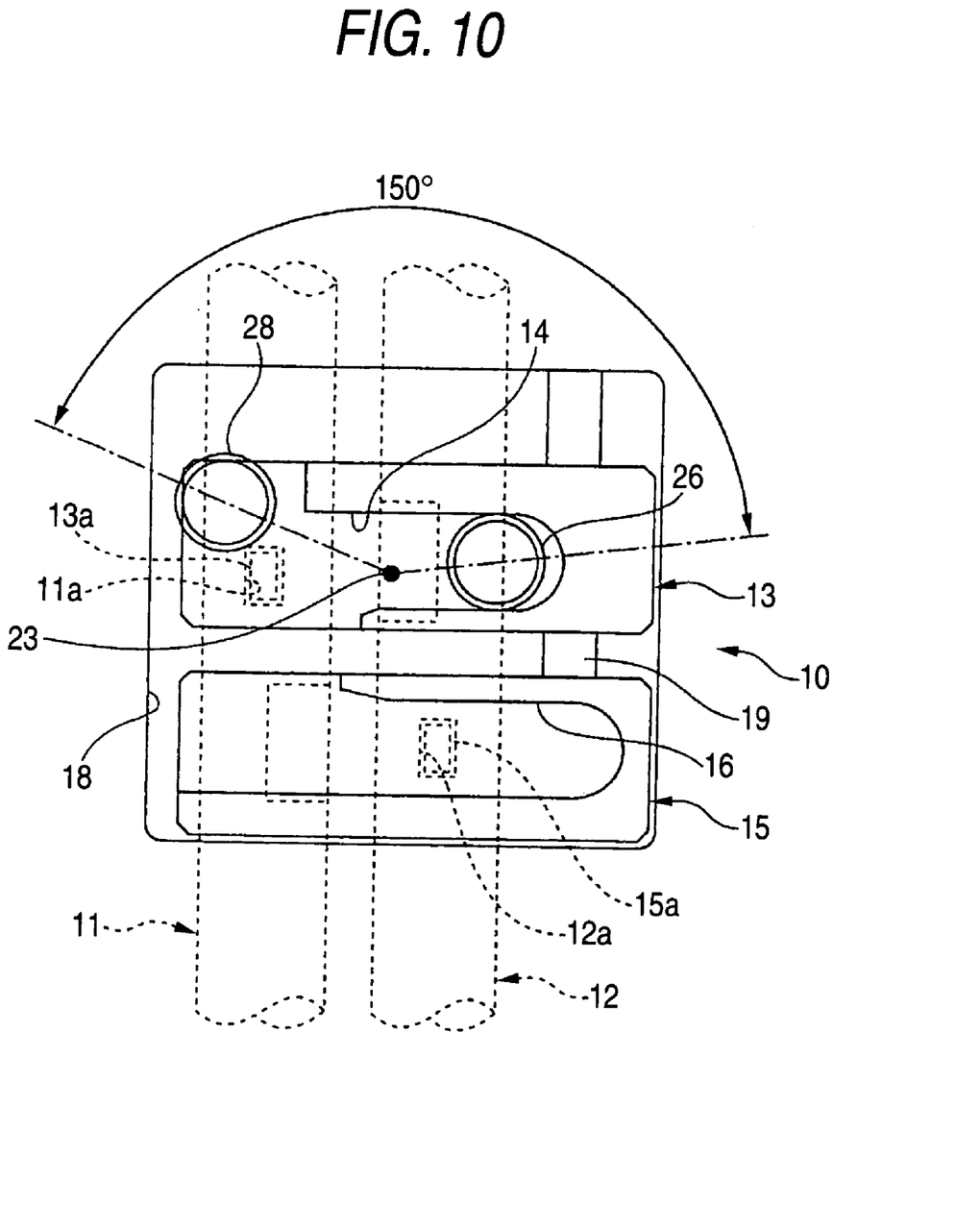
FIG. 10 is an explanatory drawing showing the two-wheel driving condition of the above two-wheel drive and four-wheel drive change-over apparatus.
Figure 11:
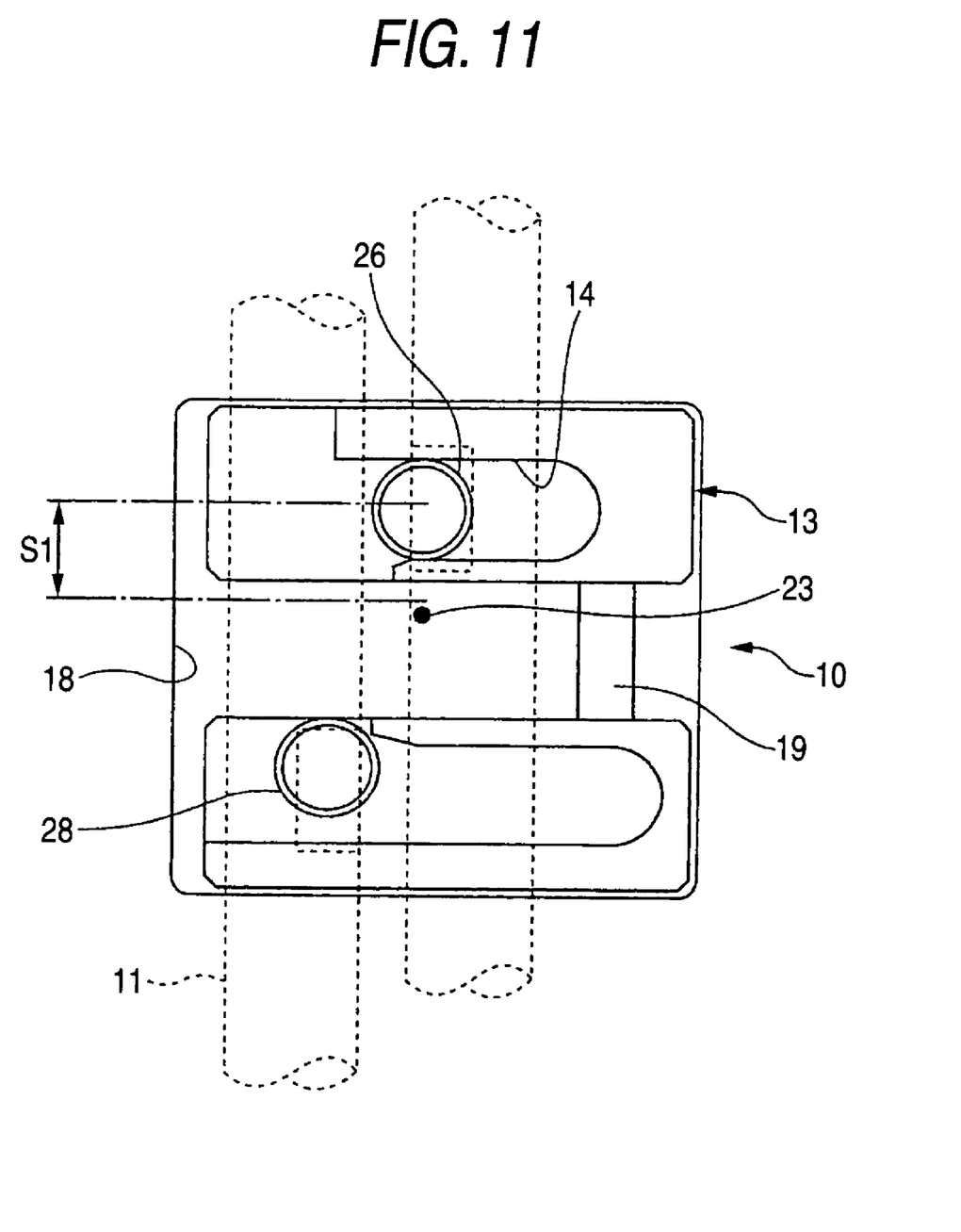
FIG. 11 is an explanatory drawing showing the four-wheel high-speed driving condition of the above two-wheel drive and four-wheel drive change-over apparatus.
Figure 12:
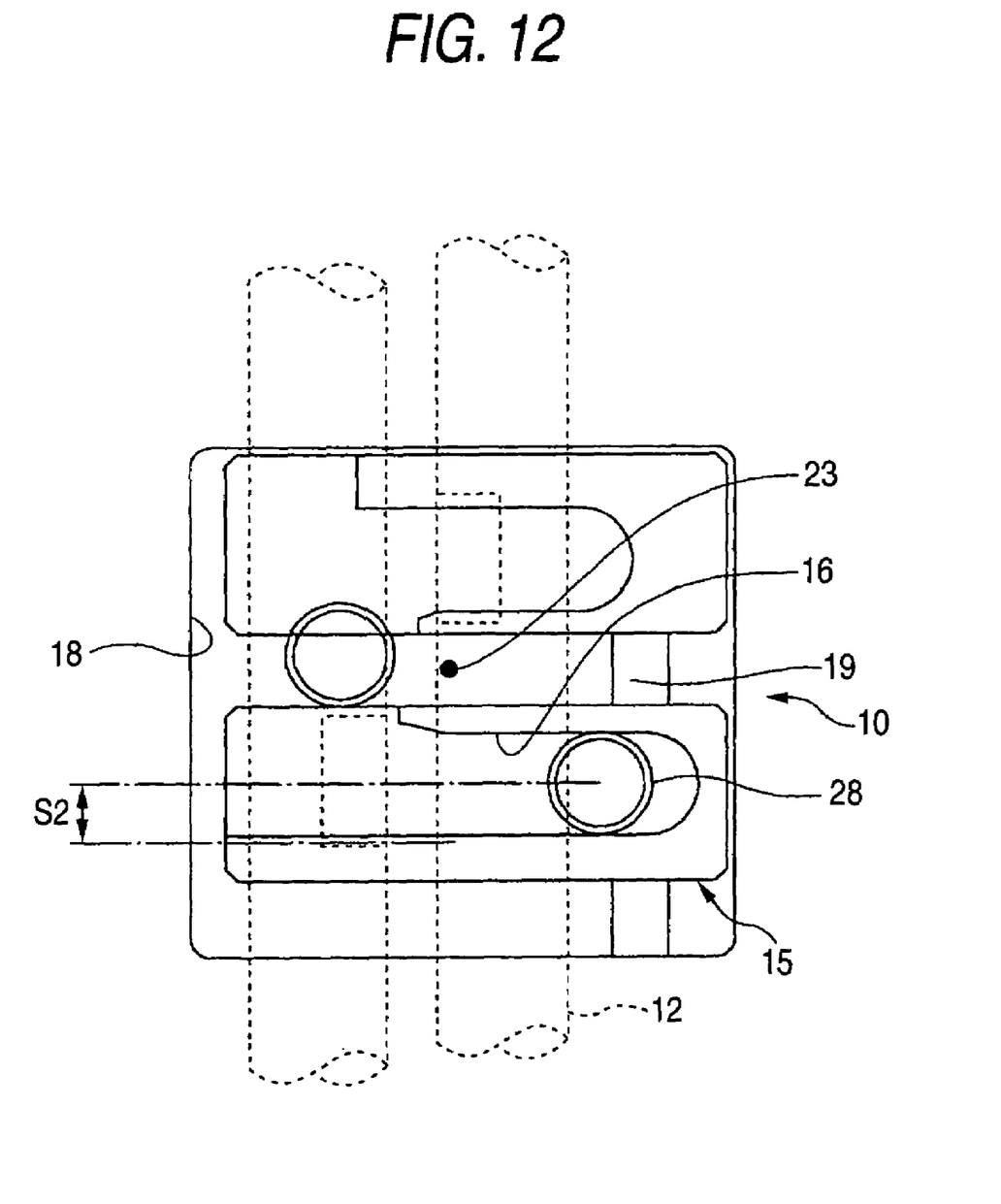
FIG. 12 is an explanatory drawing showing the four-wheel neutral condition of the above two-wheel drive and four-wheel drive change-over apparatus.
Figure 13:
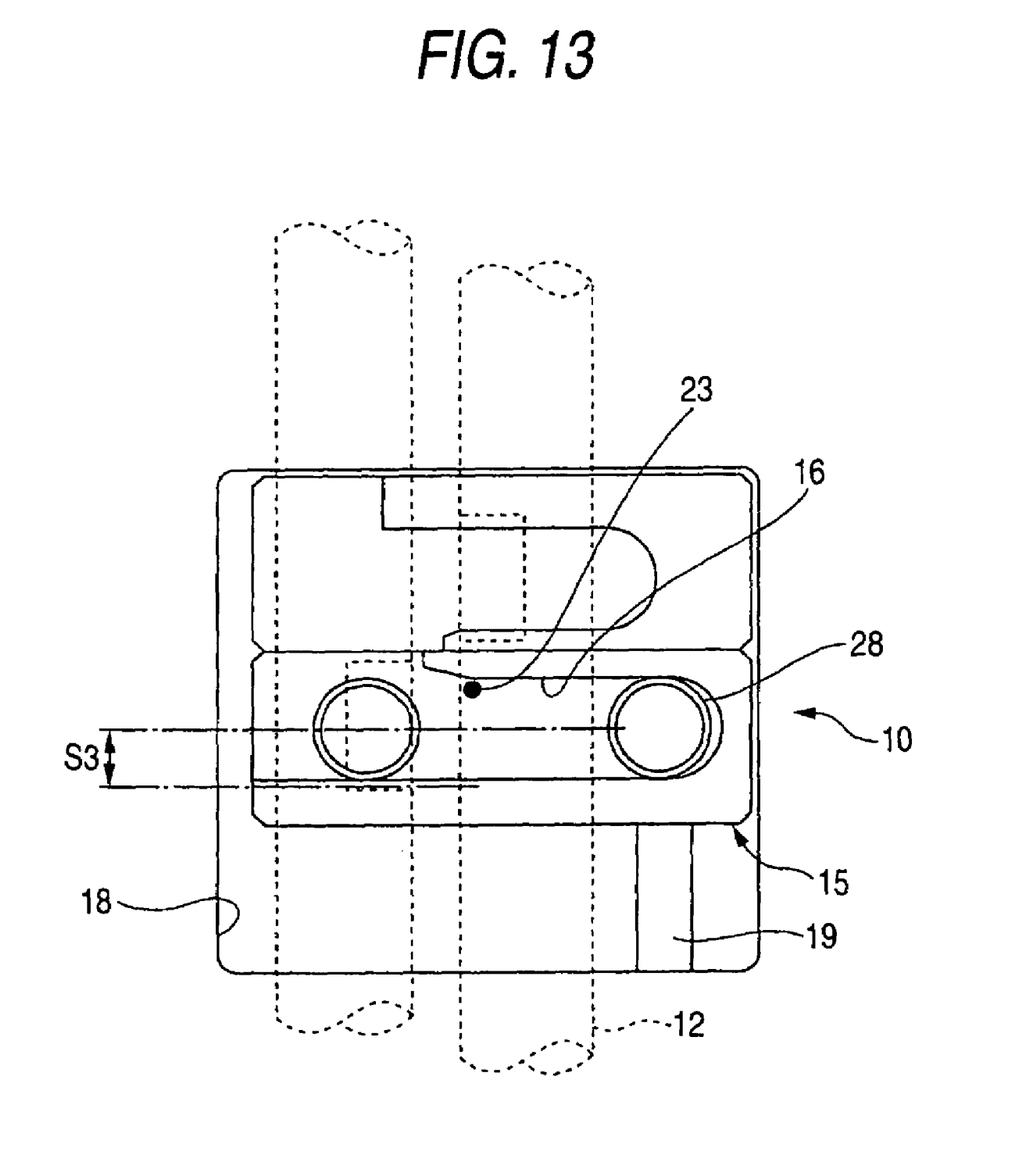
FIG. 13 is an explanatory drawing showing the four-wheel low-speed driving condition of the above two-wheel drive and four-wheel drive change-over apparatus.
Figure 14:
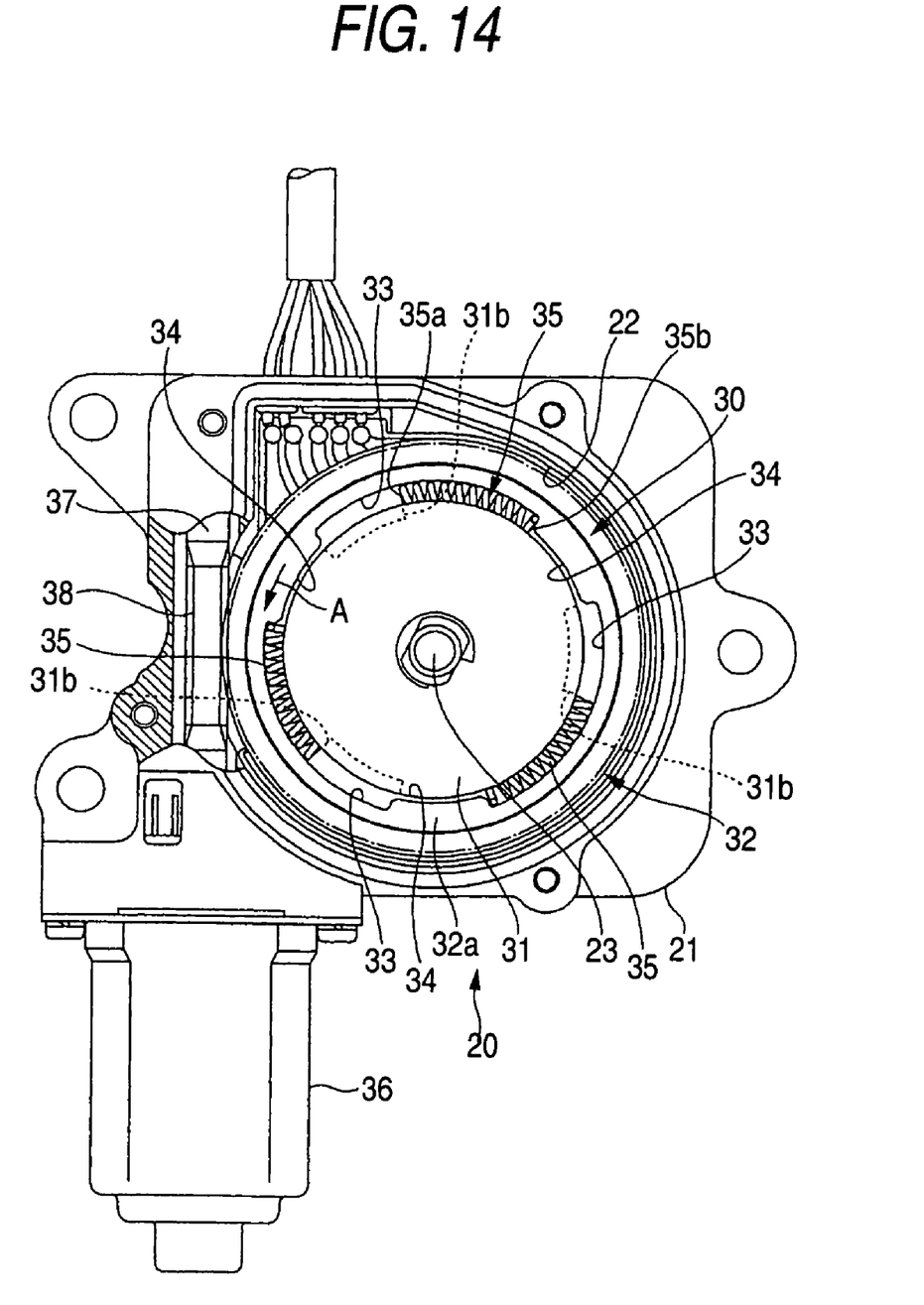
FIG. 14 is a partially sectioned plan view of the waiting mechanism with the above actuator in a forwardly rotating state.
Figure 15:
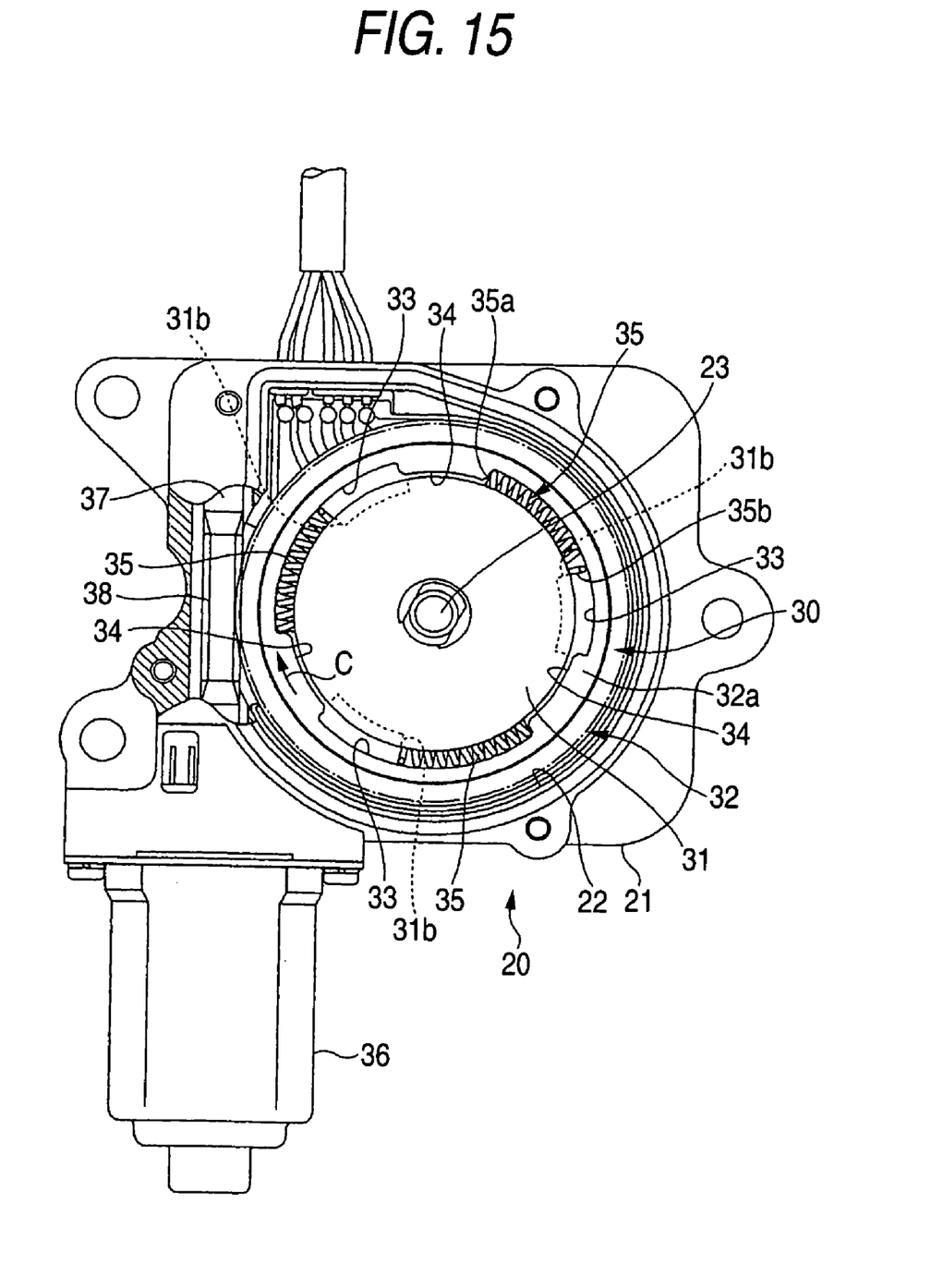
FIG. 15 is a partially sectioned plan view of the waiting mechanism with the above actuator in a backwardly rotating state.

FIG. 1 is a perspective view showing a principal portion of an actuator used in a mode of embodiment of the two-wheel drive and four-wheel drive change-over apparatus according the present invention, FIG. 2 a perspective view showing the same actuator viewed from a rear side thereof, FIG. 3 a partially sectioned plan view of the same actuator, FIG. 4 a plan view showing the same actuator with a rotation retaining plate removed therefrom, FIG. 5 an exploded view in perspective showing the relation between the rotation retaining plate, a driving gear and an output shaft of the same actuator, FIG. 6 a bottom view of the same rotation retaining plate, FIG. 7 a perspective view of the same output shaft, FIG. 8 a bottom view of the same output shaft, FIG. 9 a schematic construction diagram of a part-time four-wheel drive vehicle in which the same two-wheel drive and four-wheel drive change-over apparatus is used, FIG. 10 an explanatory drawing showing two-wheel driving condition of the same two-wheel drive and four-wheel drive change-over apparatus, FIG. 11 an explanatory drawing showing four-wheel high-speed driving condition of the two-wheel drive and four-wheel drive change-over apparatus, FIG. 12 an explanatory drawing showing four-wheel neutral condition of the same two-wheel drive and four-wheel drive change-over apparatus, FIG. 13 an explanatory drawing showing four-wheel low-speed driving condition of the same two-wheel drive and four-wheel drive change-over apparatus, FIG. 14a partially sectioned plan view of a waiting mechanism at the forward rotation time of the same actuator, and FIG. 15a partially sectioned plan view of the waiting mechanism at the backward rotation time of the same actuator.

As shown in FIG. 9, a part-time four-wheel drive vehicle (4WD vehicle) 1 is provided with an engine 2, a transmission 3 and a transfer 4. A two-wheel drive and four-wheel drive change-over apparatus 10 is fixed to this transfer 4. While this part-time 4WD 1 travels regularly, a two-wheel drive and four-wheel drive change-over shaft 11 as a driven shaft and a four-wheel speed change-over shaft 12 also as a driven shaft which are arranged in parallel with each other in the transfer 4 are in predetermined positions shown in FIG. 10, and in a two-wheel driving (2H) condition. In this case, the power of the engine 2 is transmitted to rear wheels 7B, 7B via an output shaft 5 for rear wheels and a differential machine 6B for rear wheels, and a two-wheel driving operation by the rear wheels 7B, 7B is carried out.

When the two-wheel drive and four-wheel drive change-over shaft 11 is moved in the axial direction at a predetermined stroke by the two-wheel drive and four-wheel drive change-over apparatus 10 as shown in FIG. 11, the vehicle is put in a four-wheel high-speed driving (4H) condition, and a two-wheel and four-wheel change-over slider 9, which is adapted to stop and continue a meshed condition of an output gear 5a for rear wheels and a front drive gear 8a, engages (spline engages) the front drive gear 8a. As a result, the power of the engine 2 is transmitted not only to the rear wheels 7B, 7B but also to front wheels 7A, 7A via an output shaft 8 and a differential machine 6A for front wheels, and a four-wheel high-speed driving operation by the front and rear wheels 7A, 7B is carried out.

When the four-wheel speed change-over shaft 12 is moved in the axial direction thereof at a predetermined stroke by the two-wheel drive and four-wheel drive change-over apparatus 10 as shown in FIG. 12, the driving condition is switched to a four-wheel neutral (N) condition. When the four-wheel speed change-over shaft 12 is further moved in the axial direction thereof at a predetermined stroke by the two-wheel drive and four-wheel drive change-over apparatus 10 as shown in FIG. 13, the driving condition is switched to a four-wheel low-speed driving (4L) condition.

The construction of an actuator 20 adapted to switch the driving condition to the above-mentioned four kinds of condition, i.e. two-wheel driving (2H), four-wheel driving (4H), four-wheel neutral (N) and four-wheel low-speed (4L) condition by moving the two-wheel drive and four-wheel drive change-over shaft 11 and four-wheel speed change-over shaft 12, which are parallel-arranged in the transfer, will now be described.

As shown in FIG. 1 to FIG. 13, the actuator 20 is provided with a rotary plate 24 fixed to an output shaft 23 thereof and rotated in one body with the output shaft 23, and rollers 26, 28 as a pair of cam followers supported rotatably on the rotary plate 24. The two rollers 26, 28 are engaged with a pair of cams 13, 15 held on and adapted to drive the two-wheel drive and four-wheel drive change-over shaft 11 and four-wheel speed change-over shaft 12 working as driven shafts which will be described later, the rollers 26, 28 thereby driving these cams 13, 15.

This actuator 20 is further provided with a motor 36 adapted to be rotated forward or backward by a current supplied thereto, a worm 38 formed on an armature shaft 37 of the motor 36, a driving gear 32 meshed with the worm 38 and connected to the output shaft 23, a first actuator case 21 in which the driving gear 32, output shaft 23 and rotary plate 24 are housed, and a second actuator case 21a fixed to the first actuator case 21, supporting the change-over shafts 11, 12 so that the change-over shafts 11, 12 can be axially moved, and housing the cams 13, 15 therein.

As shown in FIG. 1 and FIGS. 10 to 13, the two cams 13, 15 are provided in a recess 18 of the second actuator case 21a. A support shaft 19 passed over the recess 18 is inserted through one end portion of each of the two cams 13, 15 so that the cams 13, 15 are supported slidably thereon. The second actuator case 21a is fixed to the transfer 4 via bolts (not shown) and the like, and also to the first actuator case 21 via bolts (not shown) and the like.

The cams 13, 15 are provided in upper surfaces thereof with cam grooves 14, 16 of predetermined shapes. Moreover, as shown in FIG. 10, the cams 13, 15 are provided on their respective lower surfaces with projections 13a, 15a made integral therewith. These projections 13a, 15a of the cams 13, 15 are fitted in recesses 11a, 12a formed in the change-over shafts 11, 12. Owing to this arrangement, when one cam 13 is moved slidingly on the support shaft 19, the two-wheel drive and four-wheel drive change-over shaft 11 is moved axially at a predetermined stroke in accordance with the sliding movement of the cam 13. When the other cam 15 is moved slidingly on the support shaft 19, the four-wheel speed change-over shaft 12 is moved axially at a predetermined stroke in accordance with the sliding movement of the cam 15.

As shown in FIG. 2 to FIG. 5, a circular opening 22 is formed in a substantially central portion of the first actuator case 21 of the actuator 20. A disc type rotary plate 24 fixedly mounted by press-fitting on a base end portion 23a of the output shaft 23 rotatably supported on the actuator case 21 is rotatably held in a rear side of an inner portion of this opening 22. A driving gear 32 rotatably supported on the output shaft 23 via a rotation retaining plate 31 held relatively non-rotatably on a free end portion 23b of the output shaft 23 is held in an outer side of the inner portion of the opening 22.

As shown in FIG. 2, FIG. 7 and FIG. 8, rollers (cam followers) 26, 28 are rotatably supported via support shafts 25, 27 on a rear surface of the rotary plate 24 fixedly mounted on the base end portion 23a of the output shaft 23. One roller 26 is fixed to the portion of the rear surface of the rotary plate 24 which is a shorter distance away from the center 24a of rotation of the rotary plate 24, while the other 28 is fixed to the portion of the same rear surface which is a longer distance away from the same center 24a of rotation. These two rollers 26, 28 are provided in positions spaced from each other at an angle of 150°. The first-mentioned roller 26 is made engageable with a cam groove 14 of one cam 13, and the second-mentioned roller 28 with a cam groove 16 of the other cam 15. Owing to this arrangement, the rotational movements of the rollers 26, 28 provided on the rotary plate 24 rotated by the output shaft 23 of the actuator 20 cause the change-over shafts 11, 12 to be moved forward and backward axially at predetermined strokes via the cams 13, 15.

As shown in FIG. 3 to FIG. 5, three recessed spring housings 33 are formed arcuately at regular intervals on a circle on an upper surface of a gear body 32a of the driving gear 32 which corresponds to an outer circumference of the same gear 32. In each of these spring housings 33, a cylindrical compression coil spring 35 (urging member of the invention) is housed. Slits 34 of a predetermined depth are formed in the portions of an upper surface of the gear body 32a which are among both of circumferential end surfaces 33a, 33b of one spring housing 33 and both of circumferential end surfaces 33b, 33a of an adjacent spring housing 33. Each of the slits 34 is provided so as to prevent the gear body 32a and each of spring pressing parts 31b, which are provided on the rotation retaining plate 31, and which will be described later, from interfering with each other.

As shown in FIG. 3, FIG. 5 and FIG. 6, the disc type rotation retaining plate 31 is provided at a central portion thereof with a fixing hole 31a having substantially the shape of a Japanese oval gold coin in plan, and on a lower surface of an outer periphery thereof with three arcuately curved plate type spring pressing parts 31b which are spaced from one another at regular intervals, and which are made integral with the rotation retaining plate 31 31b and project downward. The spring pressing parts 31b are normally positioned in the slits 34 of the driving gear 32. The fixing hole 31a of the rotation retaining plate 31 is fitted around the upper end portion 23b of the output shaft 23 of the actuator 20, and the rotation retaining plate 31 is prevented from slipping off by a washer 39. The output shaft 23 and rotation retaining plate 31 of this actuator 20 are normally rotated together owing to the rotation of the worm 38 of the armature shaft 37 of the motor 36 in the direction (for example, the forward direction of an arrow A in FIG. 3) identical with the that in which the driving gear 32 is rotated. However, when the output shaft 23 of the actuator 20 is locked and stopped in the intermediate position of a forward or backward rotation thereof made owing to a current supplied to the motor 36, the power for continuing the forward (direction of an arrow A in FIG. 14) or backward (direction of an arrow C in FIG. 15) movement of the driving gear 32 still exists since the supplying of the current to the motor 36 continues. Therefore, the rotation of either one of both end portions 35a, 35b of each compression coil spring 35 is stopped by the corresponding spring pressing part 31b of the rotation retaining plate 31 which is stopped with the output shaft 23 but the other end portion of each compression coil spring is pressed by the corresponding spring pressing part 31b, so that each compression coil spring 35 is bent and put in a compressed state. When each compression coil spring 35 is put in a compressed state, the driving gear 32 is locked and stopped.

The cases where the output shaft 23 of the actuator 20 is locked and stopped include a case where the phases of the two gears, i.e. the output gear 5a for rear wheels and front drive gear 8a are shifted from each other when the two-wheel driving (2H) condition is switched to the four-wheel high-speed driving (4H) condition by moving the two-wheel drive and four-wheel drive change-over shaft 11 axially at a predetermined stroke by the two-wheel drive and four-wheel drive change-over apparatus 10, to cause the spline-engaging of the two gears 5a, 8a with each other by the two-wheel and four-wheel change-over slider 9 to become impossible, and a case where the spline-engaged gears 5a, 8a cannot be released since the power needed to stop the spline-engagement of the gears 5a, 8a is too large when the four-wheel high-speed driving (4H) condition is switched to the two-wheel driving (2H) condition. Until such locked condition is released, the compression coil springs 35 are left in a compressed state as shown in FIG. 14 or FIG. 15 by an action of a waiting mechanism 30 including the rotation retaining plate 31, driving gear 32 and compression coil springs 35.

When the spline engagement phases of the two gears 5a, 8a are made to agree with each other, or, when the power needed to stop the spline engagement of the gears with each other is reduced by the two-wheel and four-wheel change-over slider 9, it becomes possible that the output shaft 23 be rotated automatically in either one of two directions, i.e., in the forward direction or in the backward direction via the rotation retaining plate 31 by a resilient force of the compression coil springs 35 which have been in a compressed state. The waiting mechanism 30 is adapted to work not only when the switching of the 2H condition to the 4H condition, and vice versa is done but also when the switching operation is done in all positions among 2H–4H–4L including a switching operation done from 4H to 4L (four-wheel low speed driving), and vice versa.

When the part-time 4WD vehicle 1 travels regularly, the two-wheel drive and four-wheel drive change-over shaft 11 and four-wheel speed change-over shaft 12 which are arranged in parallel with each other in the transfer 4 are in a two-wheel driving (2H) condition shown in FIG. 10, and the power of the engine is transmitted to the rear wheels 7B, 7B via the output shaft 5 for rear wheels of the transfer 4 and the differential machine 6B for rear wheels, so that a two-wheel driving operation by the rear wheels 7B, 7B is carried out. In this case, one roller 26 is engaged with an inner part of the cam groove 14 of one cam 13 as shown in FIG. 10. The other roller 28 is not engaged with the cam groove 16 of the other cam 15. In this case, the actuator 20 is in the condition of FIG. 3.

The actuator 20 is provided with a mode change-over switch (not shown). This mode change-over switch (not shown) is a switch for supplying a driving signal to a controller (not shown either), which is adapted to control the driving of the motor 36 of the actuator 20 in accordance with a mode of the mode change-over switch. This mode change-over switch has four modes including a two-wheel driving mode, a four-wheel high-speed driving mode, a four-wheel neutral mode and a four-wheel low-speed driving mode. The controller rotates the motor 36 forward or backward in accordance with a mode of the mode change-over switch, and thereby drives the output shaft 23 of the actuator 20 to a stopping position out of four predetermined stopping positions. When the driving gear 32 reaches a predetermined position, the supplying of a current to the motor 36 is interrupted. These four stopping positions are set within the scope of angle of one turn of the driving gear 31.

When the mode change-over switch is shifted from this two-wheel driving condition to a four-wheel high-speed driving mode, the driving gear 32 is rotated forward in the direction the arrow A shown in FIG. 3, and the output shaft 23 as well in the same direction. Owing to the rotation of the rotary plate 24 fixedly mounted on the base end portion 23a of the output shaft 23, the rollers 26, 28 are turned around the center 24a of rotation of the rotary plate 24. As shown in FIG. 11, the turning of the roller 26 causes the cam 13 to be moved slidingly in the upward direction in FIG. 11 along the support shaft 19 via the cam groove 14 of the cam 13. With the sliding movement of this cam 13, the two-wheel drive and four-wheel drive change-over shaft 11 is moved axially by one stroke S1. Owing to this movement of the stroke S1 of the two-wheel drive and four-wheel drive change-over shaft 11, the two-wheel driving condition is automatically switched to the four-wheel high-speed driving (4H) condition. Namely, the output gear 5a for rear wheels and front drive gear 8a are spline-engaged with each other by the two-wheel and four-wheel change-over slider 9 which is adapted to stop and continue the meshed state of these two gears 5a, 8a, and the power of the engine 2 is transmitted not only to the rear wheels 7B, 7B but also to the front wheels 7A, 7A via the output shaft 8 for front wheels and the differential machine 6A for front wheels, so that the four-wheel high-speed driving operation by the front and rear wheels 7A, 7B is carried out. At this time, the supplying of a current to the motor 36 is interrupted. The other roller 28 is not yet engaged with the cam groove of the cam 15. Therefore, the four-wheel speed change-over shaft 12 is not moved.

When the phases of the two gears, i.e. the output gear 5a for rear wheels and the front drive gear 8a are shifted from each other in the intermediate position of the operation for switching the two-wheel driving condition to the four-wheel high-speed driving condition by moving the two-wheel drive and four-wheel drive change-over shaft 11 axially, so that the spline-engagement of the two gears 5a, 8a with each other becomes impossible to be carried out by the two-wheel and four-wheel change-over slider 9 to cause the output shaft 23 of the actuator 20 to be stopped, the waiting mechanism 30 including the rotation retaining plate 31, driving gear 32 and compression coil springs 35 works as shown in FIG. 14. Namely, the driving gear 32 continues to be rotated forward in the direction of the arrow A shown in FIG. 14, since a current is supplied to the motor 36 even when the output shaft 23 of the actuator 20 and the rotation retaining plate 30 are locked and stopped. Therefore, the rotation of one end portion 35a of each compression coil spring 35 is prevented by the corresponding spring pressing part 31b of the stopped rotation retaining plate 31, so that each compression coil spring 35 is put in a compressed waiting state. During this time, the supplying of a current to the motor 36 is interrupted.

When the positions of the two gears, i.e. the output shaft gear 5a for rear wheels and the front drive gear 8a agree with each other, the locked condition of the output shaft 23 is released, and the output shaft 23 and rotary plate 24 are rotated forward via the spring pressing parts 31b of the rotation retaining plate 31 by the resilient repelling force of the compression coil springs 35 in a compressed state. As a result, the spline-engagement of the two gears 5a, 8a is made by the two-wheel and four-wheel change-over slider 9, and the two-wheel driving condition is switched automatically to the four-wheel high-speed driving condition.

Furthermore, even when the spline-engagement of the output shaft gear 5a for rear wheels and the front drive gear 8a becomes unable to be stopped by the two-wheel and four-wheel change-over slider 9 in the intermediate position of an operation for switching the four-wheel high-speed driving condition to the two-wheel driving condition by backwardly rotating the output shaft 23 by shifting the mode change-over switch in this mode to the two-wheel driving mode, the rotation of the second-mentioned end portion 35b of each compression coil spring 35 of the waiting mechanism is prevented as shown in FIG. 15, by the corresponding spring pressing part 31b of the stopped rotation retaining plate 31. As a result, each compression coil spring 35 is put in a compressed waiting condition. Therefore, when the locked and stopped condition of the output shaft 23 is released in the same manner as in the above-mentioned case where the two-wheel driving condition is switched to the four-wheel high-speed driving condition, the four-wheel high-speed driving condition can be switched automatically to the two-wheel driving condition. Moreover, the waiting mechanism 30 works not only in the case where the switching of the 2H and 4H from one to the other is done but also when the switching operation is done in all positions among 2H–4H–4L including a switching operation done from 4H to 4L (four-wheel low-speed driving), and vice versa which will be described later.

When the output shaft 23 is further rotated forward by shifting the mode change-over switch from the four-wheel high-speed driving mode shown in FIG. 11 to the four-wheel neutral mode, the second-mentioned roller 28 engages the cam groove 16 of the second-mentioned cam 15 as shown in FIG. 12, by the rotation of the rotary plate 24 fixedly mounted on the base end portion 23a of the output shaft, the cam 15 being thereby moved slidingly upward in FIG. 12 along the support shaft 19. With the sliding movement of this cam 15, the four-wheel speed change-over shaft 12 is moved axially by a stroke S2. Owing to the movement of this four-wheel speed change-over shaft 12 by the stroke S2, the driving condition is switched automatically to the four-wheel neutral (N) condition. Since the roller 26 leaves the cam groove 14 of the cam 13 at this time to cause the roller 26 and cam groove 14 to be disengaged from each other, the two-wheel drive and four-wheel drive change-over shaft 11 is not moved.

When the output shaft 23 is further rotated forward by shifting the mode change-over switch from the four-wheel neutral mode shown in FIG. 12 to the four-wheel low-speed driving mode, the second-mentioned cam 15 is moved slidingly further upward along the support shaft 19 as shown in FIG. 13. With the sliding movement of this cam 15, the four-wheel speed change-over shaft 12 is moved axially by a stroke S3. Owing to the movement of this four-wheel speed change-over shaft 12 by the stroke S3, the driving condition is switched automatically to the four-wheel low-speed driving condition.

When the driving condition is switched by a selective shifting operation of the mode change-over switch from the four-wheel low-speed driving condition to the four-wheel neutral condition, from the four-wheel neutral condition to the four-wheel high-speed driving condition, and from the four-wheel neutral condition to the four-wheel high-speed driving condition, or from the four-wheel high-speed driving condition to the two-wheel driving condition, the motor 36 is rotated backward, so that the output shaft 23 is rotated backward. As a result, the output shaft 23 is driven to a predetermined stopping position in accordance with the mode switched by the mode change-over switch. The two-wheel drive and four-wheel drive change-over shaft 11 or the four-wheel speed change-over shaft 12 is then moved by a predetermined stroke by driving the cam 13 or cam 15, the driving condition being thereby switched to each selected condition.

Thus, the change-over shaft driving slidable cams 13, 15 are held on the two-wheel drive and four-wheel drive change-over shaft 11 and four-wheel speed change-over shaft 12, and the two rollers 26, 28 supported rotatably on the rotary plate 24 fixedly mounted on the output shaft 23 of the actuator 20 are engaged with the cams 13, 15 respectively. The two rollers 26, 28 are used as cam followers for driving the cams 13, 15. Since the change-over shafts 11, 12 are set movable in the axial direction thereof at a predetermined stroke via the cam followers 26, 28 and cams 13, 15 by the driving force of the actuator 20, the four driving condition including the two-wheel driving condition, four-wheel high-speed driving condition, four-wheel neutral condition and four-wheel low-speed driving condition can be switched from one to another automatically and simply.

The waiting mechanism 30 can be assembled simply by only providing compression coil springs 35 in the respective spring housings 33 of the driving gear 32 mounted rotatably on the output shaft 23 via the rotation retaining plate 31 mounted on the upper end portion 23b of the output shaft 23 so that the rotation retaining plate 31 cannot be rotated relatively thereto. This enables the work efficiency in this assembling operation to be improved, the waiting mechanism 30 to be miniaturized, the number of parts to be reduced, and a small-sized, inexpensive actuator 20 to be thereby obtained.

Since the compression coil springs 35 are held in the respective spring housings 33 formed arcuately at regular intervals along a circle which is the same as the outer circumference of the driving gear 32, a load and stress per one compression coil spring 35 can be reduced.

Each compression coil spring 35 can be bent by pressing either one of both end portions 35a, 35b thereof by the corresponding spring pressing part 31b of one rotation retaining plate 31 with the other end portion of the spring left held in the corresponding spring housing 33. This enables the manufacturing cost to be reduced correspondingly to a great extent. Moreover, since each compression coil spring 35 is held in each spring housing 33, the compression coil spring 35 functions as a damper for absorbing an impact force when the output shaft 23 is locked and stopped, so that the breakage of each part constituting the actuator 20 can be prevented.

Although the two-wheel drive and four-wheel drive change-over apparatus used for a part-time 4WD vehicle made of a two-wheel drive vehicle capable of driving four wheels only when occasion demands, and the actuator for driving the change-over apparatus were described in these modes of embodiment, each of the modes of embodiment can, of course, be applied to a two-wheel drive and four-wheel drive change-over apparatus used for a 4WD vehicle other than the part-time 4WD vehicle, and an actuator for such a change-over apparatus. These modes of embodiment can also be applied to an actuator for driving two driven shafts arranged in parallel with each other and adapted to be moved freely in the axial direction thereof.

In the actuator according to the present invention described above, the waiting mechanism is formed by a driving gear meshed with a worm, coil springs held in a plurality of spring housings formed at predetermined intervals along a circle which is the same as the outer circumference of this driving gear, a rotation retaining plate which has a plurality of spring pressing parts projecting therefrom and capable of pressing either one of both end portions of the respective springs, and which is mounted on an output shaft so that the rotation retaining plate cannot be rotated relatively thereto, and slits formed in the portions of the driving gear which are among the spring housings so as to prevent the driving gear and spring pressing parts from interfering with each other. This enables the waiting mechanism to be assembled simply, the work efficiency in this assembling operation to be improved, the waiting mechanism to be miniaturized, the number of parts to be reduced, and, therefore, an excellent effect of obtaining a small-sized inexpensive actuator to be displayed.

Since each coil spring functions as a damper for absorbing an impact force when the output shaft is locked, the coil spring also has an effect of enabling the prevention of the breakage of each part constituting the actuator.

What is claimed is:

1. An actuator for actuating at least two driven shafts arranged in parallel with each other in axial directions thereof, through cams held on the driven shafts for driving the driven shafts respectively, so that each driven shaft is selectively moved in the axial direction thereof by a predetermined stroke by driving each cam to a predetermined stopping position in accordance with a mode changed over from another mode among a plurality of modes to be switched, the actuator comprising:
   a motor;
   a driving gear meshed with a worm formed on a shaft of the motor;
   an output shaft connected to the driving gear;
   a pair of cam followers turning by a rotation of the output shaft, and engaged with the cams so as to drive the cams;
   a plurality of urging members respectively held in a plurality of urging member housings formed at predetermined intervals along a circle on a side face of the driving gear;
   a rotation retaining plate fixed on the output shaft so as not to rotate relative to the output shaft;
   a plurality of pressing parts each of which projects from the rotation retaining plate, and each of which is capable of pressing one of both end portions of the corresponding urging member;
   slits formed on the driving gear between adjacent ones of the urging member housings so as to prevent the pressing parts from interfering with the driving gear;
   a first actuator case in which the driving gear, the rotation retaining plate and the output shaft are housed; and
   a second actuator case fixed to the first actuator case, supporting each driven shaft so that the driven shafts are moved freely in the axial direction thereof and housing each of the cams therein,
   wherein a rotation of the driving gear is transmitted to the output shaft via the urging members and the rotation retaining plate, either one of both end portions of each of the urging members being pressed by the corresponding pressing part of the rotation retaining plate when the rotation of the driving gear is continued after the output shaft is locked and stopped in an intermediate position of the rotation thereof.

2. An actuator according to claim 1, wherein the urging member housings formed on the driving gear are three arcuate urging member housings arranged at regular intervals in the circumferential direction thereof, the urging members being three cylindrical compression springs.

3. An actuator for actuating a two-wheel drive and four-wheel drive change-over apparatus having a first change-over shaft for switching two-wheel drive/four-wheel drive and a second change-over shaft for changing speeds of four wheels, the first and second change-over shaft being arranged in parallel with each other in a transfer and movable in axial directions thereof by cams held on the first and second change-over shafts for driving the first and second change-over shafts respectively, wherein the actuator is adapted to switch selectively from one to another of four driving conditions including two-wheel drive, four-wheel high-speed drive, four-wheel neutral and four-wheel low-speed driving condition by driving the cams in the change-over apparatus to predetermined stopping positions respectively in accordance with a mode changed by a shifting operation of a mode change-over switch, and thereby moving the change-over shafts selectively in the axial directions at predetermined strokes, the actuator including:

a motor;

a driving gear meshed with a worm formed on a shaft of the motor;

an output shaft connected to the driving gear;

a pair of cam followers turning by a rotation of the output shaft, and engaged with the cams so as to drive the cams;

a plurality of urging members respectively held in a plurality of urging member housings formed at predetermined intervals along a circle on a side face of the driving gear;

a rotation retaining plate fixed on the output shaft so as not to rotate relative to the output shaft;

a plurality of pressing parts each of which projects from the rotation retaining plate, and each of which is capable of pressing either one of both end portions of a corresponding urging member;

slits formed on the driving gear between adjacent ones of the urging member housings so as to prevent the pressing parts from interfering with the driving gear;

a first actuator case in which the driving gear, the rotation retaining plate and the output shaft are housed; and a second actuator case fixed to the first actuator case, supporting each driven shaft so that the driven shafts are moved freely in the axial direction thereof and housing each of the cams therein, wherein a rotation of the driving gear is transmitted to the output shaft via the urging members and the rotation retaining plate, either one of both end portions of each of the urging members being pressed by the corresponding pressing part of the rotation retaining plate when the rotation of the driving gear is continued after the output shaft is locked and stopped in an intermediate position of the rotation thereof.

4. An actuator for driving a two-wheel drive and four-wheel drive change-over apparatus according to claim 3, wherein the urging member housings formed on the driving gear are three arcuate urging member housings formed on the driving gear at regular intervals in the circumferential direction thereof, the urging members being three cylindrical compression springs.

5. A two-wheel drive and four-wheel drive change-over apparatus having a first change-over shaft for switching two-wheel drive/four-wheel drive and a second change-over shaft for changing speeds of four wheels, the first and second change-over shafts being arranged in parallel with each other in a transfer and movable in axial directions thereof, cams held on the first and second change-over shafts for driving the first and the second change-over shafts respectively, and an actuator adapted to be driven rotationally to predetermined stopping positions respectively in accordance with a mode changed by a switching operation of a mode change-over switch, and drive each cam and thereby move the change-over shafts selectively in the axial directions thereof at predetermined strokes, the actuator including:

a motor;

a driving gear meshed with a worm formed on a shaft of the motor;

an output shaft connected to the driving gear;

a pair of cam followers turning by a rotation of the output shaft, and engaged with the cams so as to drive the cams;

a plurality of urging members respectively held in a plurality of urging member housings formed at predetermined intervals along a circle on a side face of the driving gear;

a rotation retaining plate fixed on the output shaft so as not to rotate relative to the output shaft;

a plurality of pressing parts each of which projects from the rotation retaining plate, and each of which is capable of pressing either one of both end portions of a corresponding urging member;

slits formed on the driving gear between adjacent ones of the urging member housings so as to prevent the pressing parts from interfering with the driving gear;

a first actuator case in which the driving gear, the rotation retaining plate and the output shaft are housed; and a second actuator case fixed to the first actuator case, supporting each driven shaft so that the driven shafts are moved freely in the axial direction thereof and housing each of the cams therein, wherein a rotation of the driving gear is transmitted to the output shaft via the urging members and the rotation retaining plate, either one of both end portions of each of the urging members being pressed by the corresponding pressing part of the rotation retaining plate when the rotation of the driving gear is continued after the output shaft is locked and stopped in an intermediate position of the rotation thereof.

6. A two-wheel drive and four-wheel drive change-over apparatus according to claim 5, wherein the plural urging member housings formed on the driving gear are three arcuate urging member housings formed at predetermined intervals along a circle which is the same as an outer circumference of the driving gear, the urging members being three cylindrical compression springs.

\* \* \* \* \*